Patented June 1, 1937

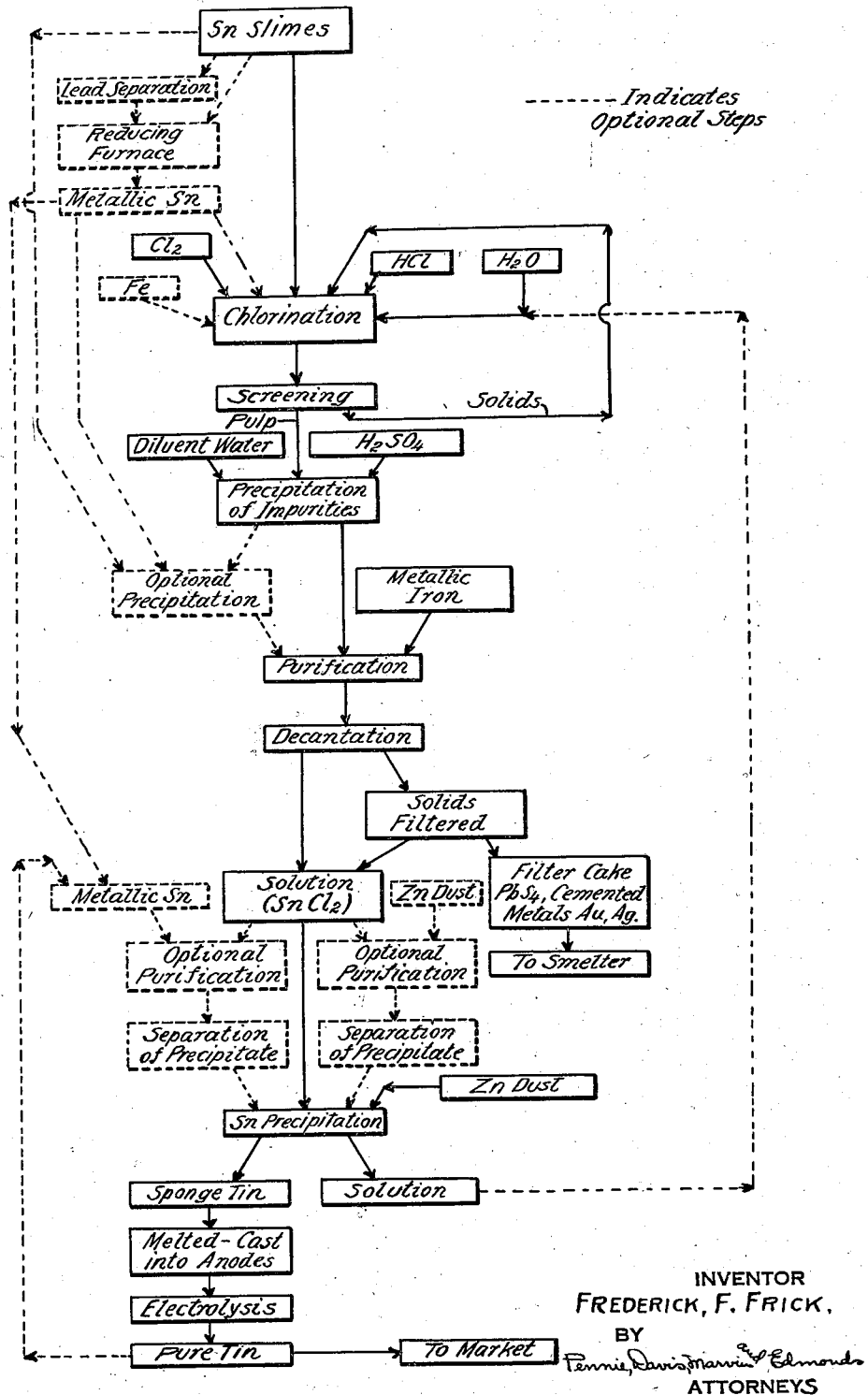

2,082,487

UNITED STATES PATENT OFFICE 2,082,487

METALLURGY OF TIN

Frederick F. Frick, Anaconda, Mont., assignor to International Smelting and Refining Company, East Chicago, Ind., a corporation of Montana Application February 14, 1936, Serial No. 63,836

3 Claims. (Cl. 75—99)

This invention relates to the recovery of tin from tin-bearing materials. The invention particularly contemplates the treatment of metallurgical and chemical products and residues containing tin, for example, tin-bearing electrolytic cell slimes produced in the treatment of secondary metal processes, and has for its object the provision of an improved process for treating such products and residues for the recovery of tin therefrom.

Many secondary metals contain tin in varying quantities, and in plants designed for the treatment of secondary metals for the recovery of metal values the problem of recovering tin must be met. This problem presents great practical difficulties for two reasons. The first is that secondary metals may contain all of the common and many of the rare metals, each of which constitutes an impurity with respect to the other and necessitates a rather complex process to recover each metal in relatively pure, marketable form. The second reason is that compounds of tin, owing to the ease with which they form slimy, insoluble colloidal precipitates, are very difficult to treat.

In accordance with the present invention an improved process is provided for the recovery of tin from tin-bearing materials, by means of which impurities may be separated effectively from the material in concentrated form and in which the formation of precipitates difficult to treat is avoided. The following process is mentioned as typical of secondary metal processes yielding tin-bearing residues which may be treated effectively in accordance with the present invention for the recovery of their tin contents.

Scrap metal containing copper, tin, zinc, lead and other metals is subjected to a smelting operation, during the course of which some lead and zinc are eliminated in the form of fume, and the smelted product is cast into anodes. The anodes are electrolyzed for the recovery of copper and an electrolytic cell slime containing most of the tin and lead and other metals such as antimony, arsenic, bismuth, nickel, iron, gold and silver which may have been present originally in the anode metal is produced. This slime is roasted and then leached with copper cell electrolyte to extract copper contained therein, and the leached residue is subjected to a further leaching operation to dissolve out most of the lead. The residue, after lead removal, is subjected to pyrometallurgical reduction in the presence of a carbonaceous reducing agent to produce an anode metal which usually contains 75% to 90% tin and most of the other metals such as lead-antimony, arsenic, bismuth, nickel, iron, gold and silver which were present in the residue reduced. The reduced anode metal is electrolyzed to give tin cathodes and another electrolytic cell slime containing 10% to 40% tin and most of the metal impurities which were present in the tin anode metal. The treatment of this slime is desirable not only for its tin content but also for the gold and silver which it contains, and may be accomplished by means of the process of the invention.

Briefly, the process of the invention comprises subjecting impure tin-bearing material to a chlorination operation in the course of which a solution of tin chloride is obtained. Considerable amounts of the impurities are dissolved as chlorides along with the tin, and to remove these impurities the solution from the chlorination operation is subjected to a purification operation involving precipitation of the impurities by cementation. The precipitated impurities are separated and the purified solution is treated to recover the tin which it contains.

Finely divided material containing tin together with impurities may be subjected directly to the chlorination operation in the form of a pulp or the material may be subjected to pyrometallurgical treatment to produce an impure metallic tin-bearing product suitable for chlorination. The chlorination operation is carried out in the presence of water (or solution from a preceding chlorination operation) which preferably is acidified with hydrochloric acid. Chlorine is passed in contact with the tin-bearing material until a substantial quantity or all of the tin has been dissolved as tin chloride. The chlorination operation is conducted so as to yield a relatively concentrated tin chloride solution.

The mixture of solids and liquids from the chlorination operation is diluted with water, thereby causing the precipitation of some antimony and bismuth, if such impurities are contained in the solution, as oxychlorides. It is also advisable to add sulphuric acid. The resulting solution, still mixed with solids, is subjected to a cementation operation in the presence of metallic iron. The iron will displace most of the metals in solution as impurities, the iron going into solution and the impurities cementing out. The iron also reduces tin in solution as stannic chloride to the form of stannous chloride, which is highly desirable for purposes of subsequent tin recovery.

The solids are separated from the solution by decantation or filtration, and the solution may, if desired, be subjected to an optional purification operation to precipitate further quantities of impurities. This may be done by passing the solution in contact with metallic tin, or by treating it with a small quantity of metallic zinc, insufficient in amount to precipitate a substantial proportion of the tin from solution.

Recovery of metallic tin from the purified solution is brought about by treating the solution with a metal higher in the electromotive series than tin, preferably metallic zinc in the form of zinc dust. The tin precipitates readily from the solution, notwithstanding the presence of considerable free acid, and the sponge tin formed is suitable for casting into the form of anodes and electrolyzing for the production of a high grade metallic tin product.

The invention will be better understood from the following description, referring to the accompanying flowsheet. The process is described below as applied to tin-bearing electrolytic cell slimes, for the treatment of which it is particularly well suited, but it is undertood that other tin-bearing materials may also be treated in accordance with the invention.

Tin-bearing slimes may be subjected directly in the form of a pulp (i. e. a mixture of solids and liquid) to the chlorination operation In some cases, however, especially when treating a low-grade slime, the slime may be treated pyro-metallurgically, either directly or after separation of the bulk of the lead, to produce an impure metallic tin product suitable for chlorination. To this end the slimes may be reduced by means of a carbonaceous reducing agent in accordance with well-known methods to obtain a crude metallic tin product which will contain a considerable proportion of metallic impurities present in the slime reduced.

Whether or not the slimes are first reduced as mentioned above, the chlorination procedure is much the same. The slimes (or impure metal, which advantageously may be in granulated form) are mixed with water to form a pulp. The amount of water should be correlated with the tin content of the slimes (or metal) so that the solution after chlorination will contain about 300 to 500 grams of tin per liter. Hydrochloric acid is added in amount up to about 5% by weight of the slime (or metal). Iron, either metallic or in solution, may also be incorporated in the pulp in amount up to 5% by weight of the slime (or metal).

The resulting pulp is introduced into a suitable vessel, such as a stoneware container or a brick-lined mill, and chlorine is passed into it. The chlorine is rapidly absorbed and combined with the solid component of the pulp to form chlorides of metals contained therein, substantially in accordance with the following illustrative reactions:

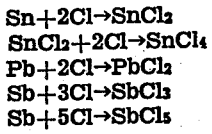

When tin is chlorinated it probably passes into solution principally as stannous chloride ($SnCl_2$). When most of the tin has been dissolved, further chlorination oxidizes the stannous chloride to stannic chloride ($SnCl_4$). In chlorinating an impure product or residue such as contemplated by the present invention, however, this simple process is considerably complicated by the simultaneous chlorination of the metal impurities. Some metals chlorinate more readily than others, and the preference of any given metal for chlorine will depend to a considerable extent on the degree to which the other metals present have been chlorinated. It is safe to say that tin chlorinates more readily than any of the other metals likely to be present in appreciable amounts, but this statement does not mean that no other metals will chlorinate while unchlorinated tin is still available; some chlorination of impurities occurs no matter how much unchlorinated tin is present. Of course, the farther the chlorination operation is carried, the greater will be the amount of tin chlorinated and hence recoverable, but as chlorination of the tin approaches completion, the rate at which impurities are chlorinated increases, and hence the rate at which chlorine is consumed increases with respect to the amount of tin chlorinated. Consequently, an economic balance will be reached beyond which it will not be profitable to chlorinate. The point at which this balance is reached depends upon conditions and upon the quality of the slime being treated, and will vary somewhat with individual operations.

The rate at which chlorination proceeds is increased by heat, but it is inadvisable to allow the temperature of the pulp to exceed about 110° C. Otherwise, excessive quantities of fumes of metal chlorides, particularly stannic chloride, will develop and may be lost. The chlorination reactions themselves are distinctly exothermic and the temperature of the pulp may therefore be controlled by regulating the rate at which heat is extracted. Cooling jackets applied to the surface of the reaction vessel or cooling coils immersed in the pulp will serve for this purpose.

As the chlorination proceeds insoluble chlorides are precipitated. Some antimony comes down as the oxychloride and some lead chloride precipitates. Most of the gold and silver remain in insoluble forms. Substantially all of the tin goes into and remains in solution, and considerable amounts of impurities are also dissolved. As pointed out above, the amount of water in the pulp should be such that the chlorination product comprises a solution containing 300 to 500 grams of tin per liter. The advantages of producing so concentrated a solution are twofold: less chlorination equipment is required, and in concentrated solution a considerable amount of chlorides that would precipitate in dilute solutions, such as antimony chloride, are held in solution, thus facilitating handling of the pulp.

At the completion of the chlorination operation the pulp is withdrawn from the reaction vessel and is screened to remove coarse unchlorinated particles which may be returned to a subsequent chlorination operation.

The screened pulp is next treated for the removal of impurities. It would be possible to separate solids from the solution at this stage, but the pulp is thick (the solution itself being concentrated and viscous) and corrosive, and in any event a further quantity of impurities is yet to be precipitated. It is therefore simpler and more economical to proceed with the purification, involving precipitation, directly and to separate the solids at a later stage.

The pulp is diluted with about four to ten times its own volume of water, and sulphuric acid is added in such amount that the diluted pulp carries from about 75 to about 25 grams $H_2SO_4$ per liter. Dilution of the pulp brings about a heavy precipitation of antimony oxychlorides, and will also cause precipitation of bismuth oxychloride. In addition, dilution of the solution facilitates settling of the precipitated impurities. The sulphuric acid, which may be added directly but preferably is added in solution in the diluent water, serves a double purpose: it holds the tin in solution, and it precipitates lead as lead sulphate.

After dilution and acidification with sulphuric acid, the purpose is to precipitate dissolved metallic impurities to as great an extent as practical, to reduce stannic salts to stannous salts in order to facilitate subsequent precipitation of the tin, and to accomplish these ends as economically as possible. Cementation with metallic iron serves very well for this purpose. A satisfactory method of carrying out this operation consists in passing the pulp through a ball mill containing iron balls, but other methods are also available. Iron, being higher in the electromotive series than most of the metal impurities, displaces the metal impurities from solution and causes them to precipitate in metallic form. The iron also combines with chlorine in combination as stannic chloride, reducing the stannic chloride to stannous chloride. In general, no difficulties requiring particular mention are experienced in carrying out the cementation operation. The following reactions are typical of those occurring during the progress of the cementation operation:

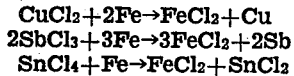

The pulp from the cementation operation comprises a solution containing most of the tin in stannous form and some ferrous chloride and solid matter, for the most part consisting of antimony oxychloride, lead sulphate and cemented metals. The solids settle rapidly and cleanly from solution, and the clear supernatant liquid is decanted. The settled solids are filtered and washed, the solution from the filter advantageously being united with the decanted solution, and the filter cake, containing substantially all of the gold and silver, is sent to a smelter for the recovery of its metal values.

The two main steps of chlorination and cementation are very closely related. They have been considered separately above, and it is advisable to consider them now in their relation to one another. Metallic tin will precipitate most of the other metals present from their solutions, and, consequently, metallic tin could be used instead of metallic iron in the cementation step to precipitate metal impurities from the solution (although it would not be quite so effective because it lies below iron in the electromotive series). Now, electrolytic cell slimes of the character treated in accordance with this description generally contain a considerable amount of metallic tin. It is therefore apparent that the original slimes (or impure metallic tin prepared from such slimes) may be utilized to precipitate a quantity of the impurities in place of the iron that otherwise would be required therefor in the cementation step, and that it is evident that such procedure will result in some saving in chlorine because it obviates the necessity of subjecting all of the original material to the chlorination treatment.

Advantage may be taken of this state of affairs by carrying out an optional precipitation operation after dilution and acidification of the pulp but before final cementation with metallic iron. The diluted pulp is introduced into contact with a portion of the original slimes containing metallic tin, or with a portion of the metal reduced from the slimes. For example, the pulp may be passed through a ball mill having tin balls, or through a mass of the metal or slimes in subdivided form. This procedure reduces the amount of chlorine required in proportion to the amount of tin or slimes dissolved in precipitating impurities, and it further reduces the amount of iron consumed in the subsequent cementation in proportion to the amount of impurities that are here precipitated. It complicates the process somewhat, however, and calls for additional equipment, and so its economic worth in any given operation will depend upon the balance of its advantages and disadvantages. In any event it is important that cementation with iron be carried out to insure satisfactory purification and reduction of the stannic salts in solution to the stannic form.

The solution from the iron cementation operation may be treated at once to precipitate metallic tin, or it may first be subjected to further purification treatment. The latter course is especially desirable when the solution, even after cementation, still contains an appreciable quantity of impurities, or when it is desired to precipitate a particularly pure sponge tin product. To this end the solution may be passed in contact with metallic tin. Tin reduced from the slimes, i. e. metal that has not been subjected to chlorination, even though in alloy form, is effective at this stage of the process in precipitating undesirable metals from the solution. In some cases it may be preferred to employ pure tin for this purpose.

As an alternative to purification by means of metallic tin, the solution may be purified by treatment with metallic zinc advantageously in the form of zinc dust. The amount of zinc employed in this manner should, of course, be sufficiently small so that no substantial amount of tin will be precipitated along with the impurities.

Having obtained a sufficiently purified solution of tin, the next step is to recover the tin from this solution. Precipitation of the tin in sponge form by means of metallic zinc preferably zinc dust, has been found to be the most satisfactory procedure. The solution is introduced into a suitable vessel equipped with a high speed agitator, and the zinc dust is fed in slowly. Although the solution is quite acid, the precipitation of the tin takes place so rapidly that a satisfactory zinc dust efficiency and good tin recovery may be obtained.

The character of the sponge tin obtained depends largely upon the purity of the solution, as most of the dissolved metallic impurities are precipitated by the zinc along with the tin. With solutions of high purity pellets of sponge tin as large as small peas are obtained. These pellets are of characteristic tin color and very metallic in appearance. With relatively impure solutions the sponge tin will be quite finely divided and of a dark color. If the solution is very impure, the precipitated tin will redissolve with the evolution of hydrogen, probably as a result of a couple effect with precipitated impurities.

If the various steps of the process have been carefully carried out, the total quantity of impurities in the sponge tin usually will not exceed 5% by weight. The precipitated metal is separated from the residual solution and melted and cast into anodes which are electrolyzed to produce pure tin cathodes, so that this relatively small quantity of impurities is not of much consequence. The solution, after separation of the precipitated tin, may be used in making up a part of the pulp in a subsequent chlorination operation.

Below are given data obtained in the treatment of a tin-bearing electrolytic cell slime in accordance with the principal steps of the invention, including reduction of metal from the slimes by pyrometallurgical methods prior to chlorination but without resorting to purification after completion of the cementation operation:

|  | Metal to chlorination (300 grams) | Residue from cementation (210 grams) | Sponge tin (122 grams) |
| --- | --- | --- | --- |
| %Sn | 41.4 | 0.9 | 91.6 |
| Pb | 30.1 | 41.7 | 4.1 |
| As | 5.4 | 6.65 | 0.53 |
| Cu | 3.1 | 3.97 | 0.10 |
| Bi | 1.77 | 2.5 | Nil |
| Sb | 16.3 | 23.0 | 0.99 |
| Fe | 0.4 | 1.77 | 0.14 |
| Ni | 0.34 | | 0.41 |
| Ag and Au | 1.06 | 1.53 | Trace |

Percentage recovery of tin—90.0

Reagents used:

| | Grams |
| --- | --- |
| Chlorine | 300 |
| 60° Bé. H₂SO₄ | 150 |
| Iron | 160 |
| Zinc dust | 92 |

I claim:

1. The method of recovering tin from material containing tin, lead and antimony which comprises subjecting the material to a chlorination operation to obtain a solution containing tin chloride, lead chloride and antimony chloride, diluting the solution to precipitate the antimony from solution, adding sulphuric acid to the solution to precipitate the lead from solution, subjecting the thus treated solution to the action of metallic iron to effect further precipitation of impurities, and treating the resulting purified solution to recover elemental tin.

2. The method of recovering tin from tin-bearing electrolytic cell slimes which comprises subjecting the slimes in the form of a pulp to a chlorination operation in the presence of hydrochloric acid to obtain a pulp comprising a relatively concentrated solution of tin chloride, diluting the chlorinated pulp with water, subjecting the diluted pulp to a cementation operation in the presence of metallic iron, separating the solids from the pulp to obtain a purified solution containing tin chloride, and recovering tin therefrom.

3. The method of recovering tin from tin-bearing electrolytic cell slimes which comprises subjecting the slimes to a pyrometallurgical operation to produce an impure metallic tin product, subjecting the metallic tin product to a chlorination operation in the presence of hydrochloric acid in the amount of about five percent by weight of the metal to obtain a relatively concentrated solution of tin chloride, diluting the chlorinated solution with water and adding sulphuric acid thereto, subjecting the resulting solution to a cementation operation in the presence of metallic iron to precipitate impurities from solution, separating solids from the solution to obtain a purified solution containing tin chloride, and treating the purified solution to recover tin therefrom.

FREDERICK F. FRICK.